Aug. 31, 1954 R. R. LAW 2,688,118

MODULATION SYSTEM

Filed Aug. 25, 1950 2 Sheets-Sheet 1

INVENTOR
Russell R. Law
BY
Charles H. Brown
ATTORNEY

INVENTOR
Russell R. Law
BY
Charles H. Brown
ATTORNEY

Patented Aug. 31, 1954

2,688,118

UNITED STATES PATENT OFFICE 2,688,118

MODULATION SYSTEM

Russell R. Law, Princeton, N. J., assignor to Radio Corporation of America, a corporation of Delaware Application August 25, 1950, Serial No. 181,354

3 Claims. (Cl. 332—5)

This invention relates to a modulation system. More particularly, it relates to a system for producing amplitude modulated ultra high frequency output. Such ultra high frequency output may be produced by suitable oscillators, for example of the magnetron type.

Magnetron oscillators are practical and very efficient sources of ultra high frequency energy. Ultra high frequency amplitude modulated transmitters are useful for television, broadcast and communications services. However, in certain instances it is rather difficult to modulate directly the amplitude of the oscillations generated by magnetrons.

Therefore, an object of this invention is to devise a system whereby magnetron oscillators may more effectively be utilized for amplitude modulated transmitters.

Another object is to devise a novel system for modulating the amplitude of oscillations generated by oscillators.

A further object is to carry out the foregoing objects in a simple yet effective manner.

A further object is to enable the combination of the outputs of a plurality of magnetrons in a highly effective and efficient manner.

The foregoing and other objects of the invention will be best understood from the following description of an example thereof, reference being had to the accompanying drawings, wherein.

The objects of this invention are accomplished, briefly, in the following manner: Two FM-type magnetrons with substantially equal power outputs $P_o$ operating at the same steady-state frequency are fed through a diplexer into a common antenna or load. The term "FM-type" is used to designate magnetrons of the type having electronic frequency modulating or frequency controlling means therein. "FM guns" refers to such electronic modulating or controlling means. Amplitude modulation is accomplished by controlling the phase of the two magnetrons, the phase of one being advanced in proportion to the modulation while the phase of the other is retarded a like amount. The vector sum of the voltages in the antenna produced by the two magnetrons has a constant angular velocity and the resultant power may be made to vary between substantially zero and $2P_o$, if the two magnetrons are maintained at a predetermined quiescent or unmodulated out-of-phase relation. In the quiescent or unmodulated condition, the frequency of each magnetron is controlled and maintained equal to that of a standard or reference source, such as a crystal oscillator.

A feature of the invention is the novel type of electron multiplier tube used in the frequency control circuit for each magnetron.

Figure 1:
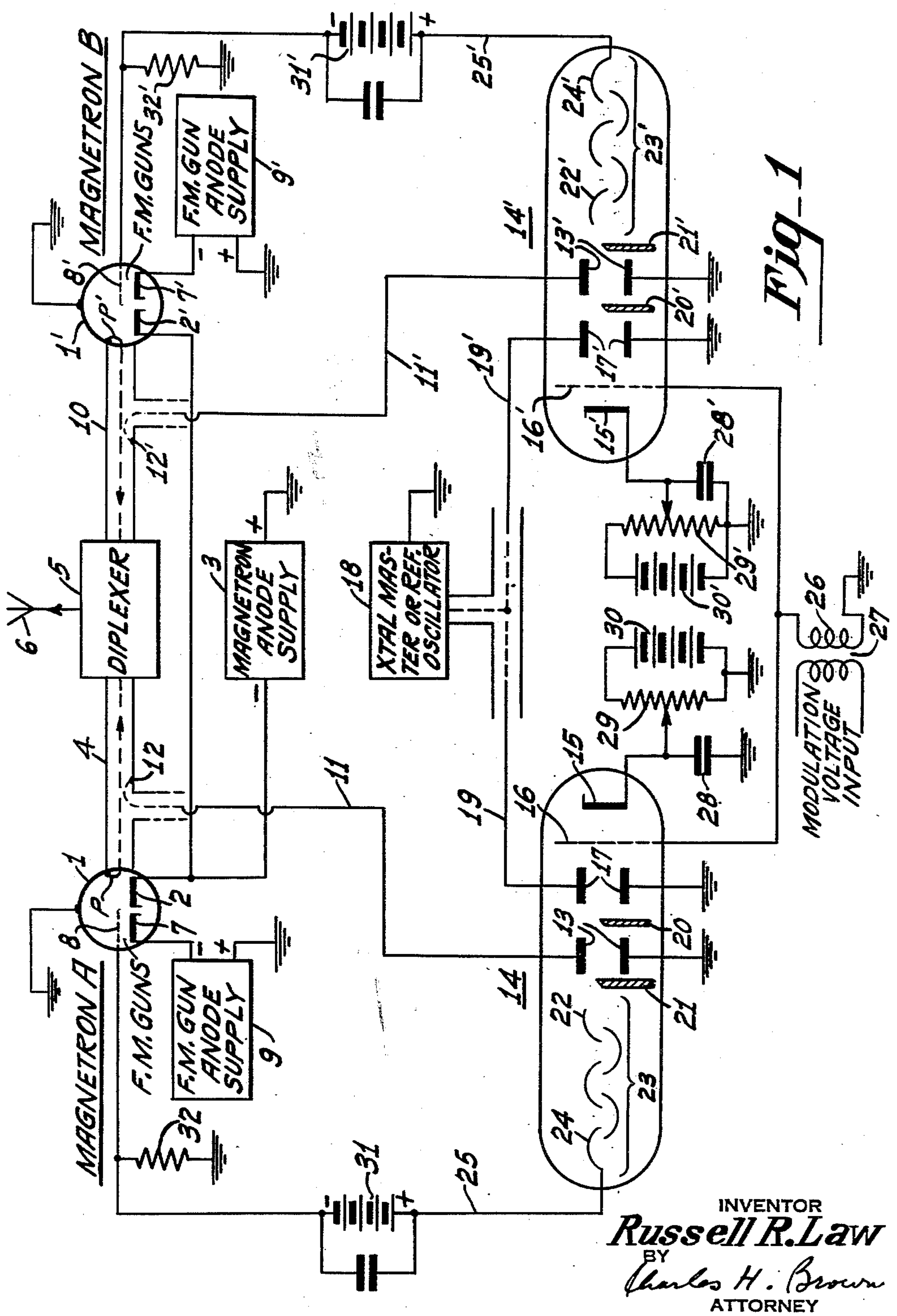
Fig. 1 is a schematic diagram of an amplitude modulation system according to this invention.

Now referring to Fig. 1, magnetron oscillator A comprises an electron discharge device having a conventional cathode 2 within an evacuated outer metallic shell or anode 1, herein shown grounded. The magnetron is, of course, provided with the customary means, not shown, for producing a magnetic field. The cathode 2 is connected to the negative terminal of a high voltage anode supply 3 the positive terminal of which is grounded as indicated. When magnetron 1 is energized by source 3, it functions to produce continuous ultra high frequency oscillations whose frequency is largely dependent upon the size and shape of the resonant cavities or cavity resonators in the interior of shell 1. These cavity resonators are not shown in order to simplify the drawing. The R. F. output from magnetron 1 is derived from a probe or loop P inside the magnetron and applied by means of coaxial feed line 4 to the diplexer 5 (the necessity for which will later become apparent). Output from the diplexer is fed to a suitable antenna 6.

The magnetron A has embodied therein a plurality of frequency control means known as "FM guns," only one of which is illustrated in Fig. 1 but each of which consists of an electron-emitting cathode 7 and an electron flow control element or grid 8. The electron beams from these guns are projected, by means of a gun anode supply 9, the negative terminal of which is connected to cathode 7 and the positive terminal of which is grounded, through cavity resonators which are integral with the cavity resonators of the magnetron 1. Control of the energy of the electron beams from cathodes 7, by the application of a suitable voltage between cathodes 7 and grids 8, provides variable shunt reactance for the frequency determining parameters of the magnetron; in this way, the output frequency of magnetron 1 is controlled. For a more complete disclosure of such frequency control means, reference is made to the copending Smith application, Serial No. 563,732, filed November 16, 1944, now abandoned. The beams from cathodes 7 are grid-controlled spiral electron beams traversing the resonant cavities of the magnetron.

Another magnetron B, similar in construction and substantially equal in output power to magnetron A, is also provided. Corresponding electrodes of the two magnetrons have the same reference numerals except for a prime designation for magnetron B. Magnetron B is energized similarly to magnetron A, and similarly functions to produce continuous ultra high frequency oscillations whose frequency is equal to that of the oscillations produced by magnetron A.

Magnetron B is similarly provided with frequency control means including grid 8′, the output frequency of such magnetron being controlled in response to the voltage applied to this grid.

The R. F. output of magnetron B is coupled to diplexer 5 by feed line 10 which, like line 4, may be a coaxial cable or waveguide. Diplexer 5 functions to couple the two inputs thereto, obtained from magnetrons A and B, to the common antenna 6 as an output load, while at the same time preventing undue interaction between the magnetrons because of their connection to the common load. A diplexer which is operative to perform this function is disclosed in the copending Brown application, Serial No. 52,635, filed October 4, 1948, which ripened on July 8, 1952, into Patent #2,602,887. In other words, the outputs of the two magnetrons are vectorially combined and applied to antenna or useful load 6.

By a system to be described hereinafter, the outputs of magnetrons A and B are maintained, in the quiescent or unmodulated state, at 90 electrical degrees to each other, at diplexer 5. The relative lengths of coaxial feed lines 4 and 10 may be varied to aid in obtaining this initial phase relation and also to make sure that the proper one of the two magnetrons is leading in phase at diplexer 5. Since the magnetrons used in this invention may operate at around 800 mc., for example, the phase relations may be easily varied by a small variation of line lengths.

A portion of the R. F. output of magnetron A is taken off feed line 4 at point 12 by means of a transmission line 11, and is applied to the second pair of deflecting plates 13 of a beam-type evacuated electron multiplier tube connected to act as a phase discriminator denoted generally by the numeral 14. Line 11 is preferably similar in construction to lines 4 and 10, and the length of line 11 may be varied to vary the phase of the ultra high frequency output appearing at plates 13. For establishing an electron beam inside the envelope of vacuum tube 14 in a direction from right to left in Fig. 1, an electron-emissive cathode 15 is provided, together with appropriate electrodes (not shown), for forming the emitted electrons into a beam. Cathode 15 is connected to ground through an R. F. bypass capacitor 28 and may be adjustably biased positively with respect to ground by a potentiometer 29 across a suitable battery 30. The electron beam emanating from cathode 15 passes through a control grid or beam intensity control electrode 16 (which is grounded) and then between the two plates of a first pair of deflecting plates 17. The purpose of electrode 16 will be later described. A stable reference frequency, derived from a crystal-controlled master or reference oscillator 18, is applied by means of a transmission line 19 to plates 17. Line 19 is preferably of the same construction as lines 4, 10 and 11.

Beyond deflecting plates 17, on the side thereof opposite from cathode 15, is a first knife-edged electrode 20 which provides a blocking aperture through which the electron beam passes. Electrode 20 operates at a fixed potential which is positive with respect to the cathode 15 and preferably takes the form of a metal element or an element with a conductive surface arranged transversely across the path of the electron beam with a straight edge normal to the effective direction of travel of such beam. Electrode 20 is so positioned and arranged as to intercept all of the electron beam when the same is deflected by plates 17 in a direction below the central longitudinal axis of tube 14.

The frequency of master oscillator 18 is intended to be the same as that of the two magnetrons which, as previously stated, operate at the same quiescent or steady-state frequency. Beyond or to the left of electrode 20 is positioned the second set of deflecting plates 13, previously referred to. The beam current through the deflecting plates 13 is interrupted at equal time intervals, that is, it is alternately on and off, due to deflection of the beam across the knife-edge blocking aperture by the alternating voltage applied to the first set of deflecting plates 17. For example, pulses of beam current pass electrode 20 only during the positive half-cycles of the alternating voltage on plates 17 and the current is cut off during the negative half-cycles of such alternating voltage. In other words, the first set of deflecting plates 17 and first knife edge 20 serve to interrupt or chop the beam.

The action so far described is somewhat more fully described in my copending application, Serial No. 658,896, filed April 2, 1946, which ripened on January 9, 1951, into Patent #2,537,769.

Beyond deflecting plates 13, on the side thereof opposite from electrode 20, is a second knife-edged electrode 21 which provides another blocking aperture through which the electron beam passes. Electrode 21 operates at a fixed potential positive with respect to cathode 15, and, like electrode 20, has a conductive surface transverse to the path of the electron beam with a straight edge normal to the effective direction of travel of such beam. Electrode 21 is so positioned and arranged as to intercept all of the (previously chopped) electron beam when the same is deflected by plates 13 in a direction below the central longitudinal axis of tube 14.

Electrode 21 functions or operates similarly to electrode 20. Electrodes 17 and 20 enable pulses of beam current to pass electrode 21 only during the time when the alternating voltage on plates 17 (derived from oscillator 18) and the alternating voltage on plates 13 (derived from magnetron A) are both positive. Were electrodes 17 and 20 not present, pulses of beam current would pass electrode 21 during the positive half-cycles of the alternating voltage on plates 13 and would be cut off during the negative half-cycles of such alternating voltage. In other words, the second set of deflecting plates 13 and second knife edge 21 determine the fraction of the chopped current (chopped by the action of electrodes 17 and 20, as previously described) that is permitted to reach the anode or electron-receiving electrode of tube 14.

Considering the two R. F. voltages as applied to plates 13 and 17, the length of the R. F. pulses produced at a point to the left of or beyond electrode 21 is of maximum value when these two R. F. voltages are in phase (because then the R. F. voltages are both positive throughout 180 electrical degrees of either voltage), is of zero value when these two R. F. voltages are 180° out of phase (because then there is no time during which the two voltages are simultaneously positive) and is of intermediate value when these two voltages are 90° out of phase. This phase discriminator characteristic is repetitive, that is, at a 270° phase relation the length of the R. F. pulses beyond electrode 21 again has an intermediate value and at a 360° phase relation again has a maximum value. This characteristic is repetitive also on the negative side of zero degrees phase relation between the two alternating voltages. At a phase relation of −90° between the two voltages, there is again an intermediate length of R. F. pulses and at −180°, a zero length of R. F. pulses. A phase angle of negative sign simply means that the phases of the two voltages are reversed in direction as compared to the relation originally considered.

Beyond or to the left of electrode 21 the electron beam impinges on the first electrode 22 of an electron multiplier electrode chain 23. This chain is in arrangement and operation substantially as described in my Patent #2,503,394, dated April 11, 1950. The electron multiplier comprises a plurality of stages, in the embodiment illustrated five stages. Each stage has a direct current circuit (not shown) for applying appropriate operating potential thereto although the anodes of the respective stages may be arranged in series direct current circuits somewhat as in said patent. The final stage or collecting electrode 24 is connected by line 25 (through a suitably bypassed battery 31 for applying the correct positive operating potential to electrode 24) to the grids 8 of the FM guns in magnetron A over a resistor 32, one end of which is grounded and the other end of which is connected to said grids, so that the current collected by said electrode is in effect applied as a control voltage to said grids to control the frequency of magnetron A. The transit time in the amplifier-multiplier stage 23 and the beam tube capacitance effects tend to level off the individual beam pulses (which are applied to electrode 22 and are interrupted at an R. F. rate determined by the normally equal frequencies of oscillator 18 and magnetron A, as previously described), so that after several stages of amplification the output current of the amplifier-multiplier 23 will be substantially steady and will be substantially proportional to the average input current (at 22) to the chain. It is this substantially steady output current which is used (by means of the FM gun grids 8) to control the frequency of magnetron A.

Similarly, a portion of the R. F. output of magnetron B is taken off by means of a transmission line 11′, which is coupled to feed line 10 at point 12′, and is applied to the second pair of deflecting plates 13′ of a beam-type phase discriminator 14′ exactly similar in construction and operation to tube 14 previously described. Line 11′ is preferably similar in construction to lines 4, 10 and 11, and the length of line 11′ may be varied to vary the phase of the ultra high frequency output appearing at plates 13′.

The arrangement including phase discriminator 14′ for magnetron B is connected in exactly the same manner as the discriminator 14 for magnetron A and operates in the same manner. For this reason, the detailed description of the arrangement will not be reiterated. The reference numerals for similar elements are primed in the magnetron B arrangement.

The stable reference frequency from master oscillator 18 is applied by transmission line 19′ to plates 17′. Line 19′ is of the same construction as line 19 and is also preferably of the same length. Therefore, the stable oscillations applied to plates 17′ are in phase with those applied to plates 17.

The final stage or collecting electrode 24′ of electron multiplier chain 23′ is connected by line 25′ through bypassed battery 31′ to the grids 8′ of the FM guns in magnetron B over resistor 32′, so that the current collected by said electrode is in effect applied as a control voltage to said grids to control the frequency of magnetron B.

Figures 2, 3:
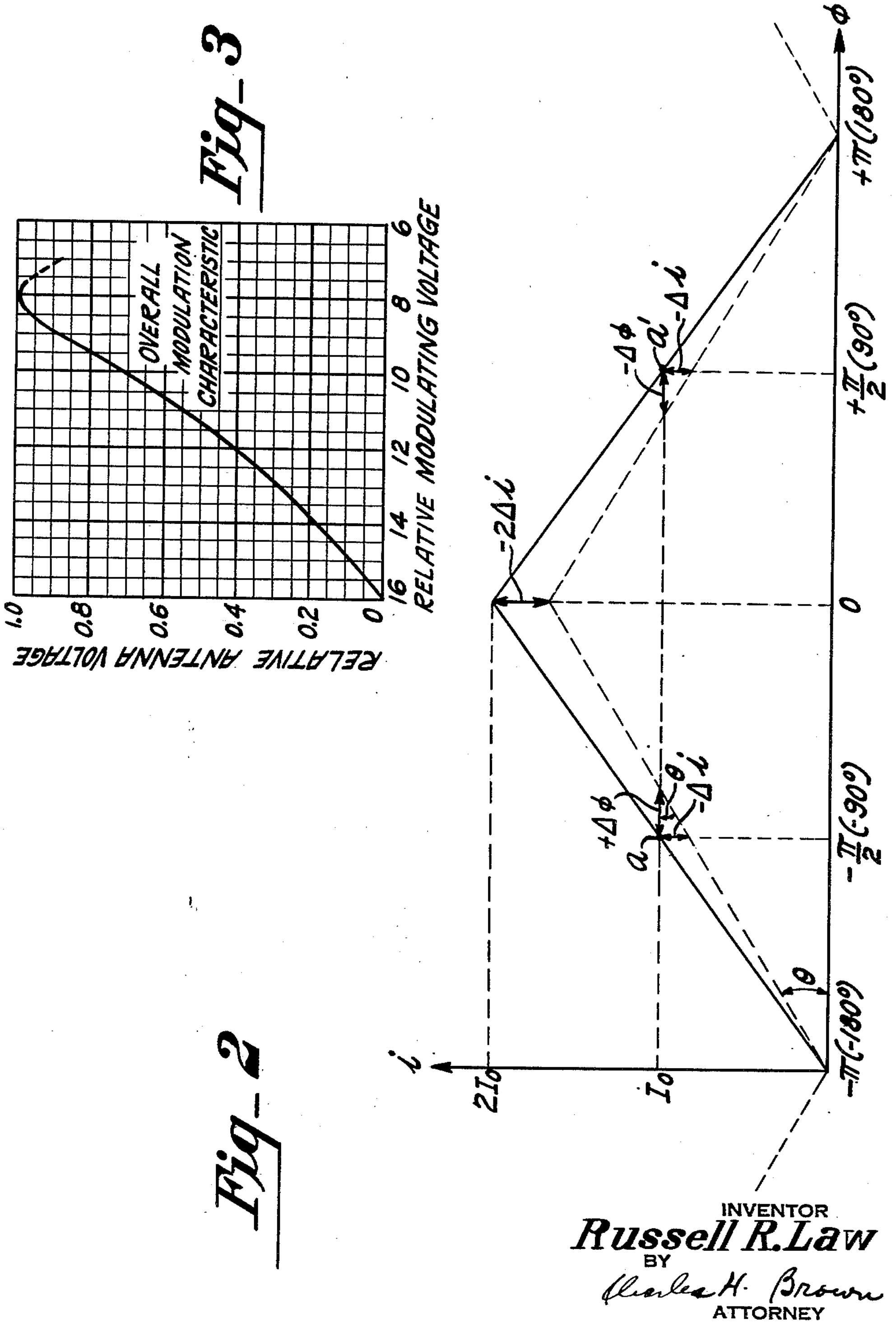
Fig. 2 is a diagram useful in explaining the invention.
Fig. 3 is a plot of a typical modulation characteristic obtainable with the system of this invention.

Now refer to Fig. 2. In this figure, the characteristic of one of the phase discriminators, 14 or 14′, is represented by the solid sloping line, which indicates the relationship between discriminator electron beam current and phase angle between the two alternating voltages applied to the discriminator deflecting plates. The two phase discriminators 14 and 14′ have identical characteristics, as previously mentioned. This characteristic indicates (as previously described) a maximum value of beam current (corresponding to the maximum-length R. F. pulses) at 0° phase and a zero beam current at 180° phase, with an intermediate value of beam current at 90° phase. The characteristic repeats itself on the negative side, as previously described, but has opposite slope.

Let us consider the static, quiescent, mean, steady-state or unmodulated condition of the system, with no modulation voltage on beam intensity control grids 16 and 16′. With zero voltage on grids 16 and 16′, a certain beam current is produced in each phase discriminator, this beam current being set or established by the bias applied to cathodes 15 and 15′. This amount of beam current acts as a voltage on each corresponding FM gun grid 8 or 8′ to provide a predetermined mean or rest output frequency for each corresponding magnetron. The inherent characteristics of the FM guns are such that a voltage on the FM gun grids is required at all times for proper frequency control.

Let us for example consider discriminator 14. This predetermined value of beam current is, of course, the result of a predetermined phase relation between the crystal voltage applied to deflecting plates 17 and the magnetron voltage applied to plates 13 of discriminator 14. This may be seen from the foregoing description and also from Fig. 2, in which the phase relation between the two alternating voltages applied to one discriminator, say 14, is plotted against beam current in the discriminator. Since an intermediate value of beam current is provided in each phase discriminator in response to a 90° phase relation between the two alternating voltages at the two sets of deflecting plates of such discriminator and since current is needed at all times by the frequency control means of the magnetrons, it is convenient to maintain the static or quiescent operating point of each phase discriminator at this quadrature phase alternating voltage relation.

The frequency control action of one of the phase discriminators, say discriminator 14, will now be described, the action of discriminator or tube 14′ being exactly similar. If the frequency of magnetron A drifts in one direction or the other from its correct value (which is the frequency of the standard source 18), a corresponding or equivalent phase change of the voltage applied to deflecting plates 13, will be produced. This phase shift, relative to the voltage applied to plates 17, from the correct quadrature phase relation, will cause either more or less output current to appear at electrode 24, depending upon the direction of the phase shift or of the drift in output frequency of magnetron A. This changed output current of tube 14 will be applied as a voltage to frequency control grids 8 of magnetron A, in such a direction as to return such magnetron to its correct or proper static or steady-state operating frequency, at which there is an intermediate value of beam current in the discriminator and a quadrature relation between the two alternating voltages at 17 and 13.

Tube 14' acts in a similar manner to maintain magnetron B at a quiescent or steady-state operating frequency equal to that of reference oscillator 18. Thus, the magnetrons A and B are both maintained at the same quiescent or steady-state output frequency.

Now consider two phase discriminators 14 and 14' that have identical characteristics as shown in Fig. 2. One of them, say tube 14, is operated at a point $a$ (90° behind the zero phase point or the voltage of reference oscillator 18) while the other, tube 14', is operated at point $a'$ (90° ahead of the zero phase or the voltage of oscillator 18). Points $a$ and $a'$ are the respective quiescent or unmodulated operating points for the two phase discriminators; as previously stated, it is convenient to operate, in each discriminator, with the magnetron-derived voltage in quadrature with the crystal-derived voltage. As may be seen from Fig. 2, since it was previously stated that the transmission lines 19 and 19' are preferably of equal lengths (which means that the alternating voltages at plates 17 and 17' are in phase) the alternating voltages at plates 13 and 13' must be 180° out of phase with each other. The proper or 180° phase relation between the magnetron voltages at 13 and at 13' may be obtained by adjustment of the lengths of the respective R. F. lines 11 and 11'. The relative phase of either magnetron voltage at its respective deflecting plates (13 or 13') is a function of the length of its corresponding R. F. line (11 or 11'). It is possible, then, to so adjust these line lengths that phase discriminator 14 operates at point $a$ under quiescent or unmodulated conditions and discriminator 14' operates at point $a'$ under the same conditions.

Up to this point in the description, quiescent or zero modulation conditions have been assumed. Tube 14 is provided with an electron beam intensity control grid 16 and tube 14' is provided with a similar control grid 16'. Grids 16 and 16' can be cophasally supplied with modulating voltages by connections from both grids to the same end of the secondary 26 of a modulation transformer 27 the primary of which is connected to a source of modulating voltages of any suitable type, such as television video signals. The end of winding 26 which is connected to grids 16 and 16', is grounded as shown.

Let us again consider tube 14. If the intensity of the electron beam in this tube is transiently increased by the application of a suitable modulating voltage to grid 16, the amplitude of the R. F. pulses (produced by the chopping action of electrodes 17 and 20) will be increased, increasing the pulse amplitude beyond or to the left of electrode 21 also and increasing also the average input current to the electron multiplier chain 23, giving an increased current output from tube 14. Conversely, the application of a modulating voltage of opposite polarity to grid 16 results in a decreased output current from tube 14.

Tube 14' is controlled similarly by grid 16', and since the two grids are supplied cophasally with modulating voltages, the currents out of tubes 14 and 14' decrease and increase together in response to applied modulating voltages.

Now returning to Fig. 2, suppose that the modulating voltage supplied by transformer 27 produces a decrease in the total current of the two discriminators 14 and 14', of $2\Delta i$, a decrease in each one of $\Delta i$, since they have identical characteristics. This is indicated as $-2\Delta i$ in Fig. 2. Up to the present time, the phase discriminator characteristics of Fig. 2 have been thought of as representing only the relation between the relative phase of the alternating voltages applied to the two sets of deflecting plates and the beam current in the corresponding discriminator. However, it is desired to be pointed out that there is, in effect, a feed-back loop or control loop associated with each discriminator, consisting of the discriminator output electrode 24 or 24', the FM gun grids 8 or 8' of the corresponding magnetron, the respective magnetron output and the respective lines 11 or 11' from the magnetron outputs to the corresponding phase discriminator 14 or 14'. If the beam current in one of the discriminators, say 14, is made to change by some other means (such as by the application of a voltage to grid 16), this changed current is applied to the grids 8 of magnetron A, resulting in an output frequency change of this magnetron oscillator. This transient change of magnetron output frequency will cause a concomitant change of phase of the voltage applied to plates 13, as compared to the crystal voltage applied to plates 17. Therefore, the characteristics of Fig. 2 may also be thought of as representing phase changes or shifts in the two phase discriminators resulting from changes of beam current in the respective discriminator, acting on the corresponding magnetron.

Again referring to Fig. 2, a decrease in total current (in both phase discriminators 14 and 14') of $2\Delta i$ will produce a phase shift of $+\Delta\phi$ in discriminator 14 and $-\Delta\phi$ in 14'. Conversely, an increase in total current will produce corresponding equal and opposite changes of phase in the two discriminators; however, in this case the changes will be in the opposite direction, discriminator 14 then having a phase shift of $-\Delta\phi$ and discriminator 14' a phase shift of $+\Delta\phi$. By geometry, it may be seen from Fig. 2 that the resulting changes of phase for an increase in total current are not as great as the changes of phase for a decrease in total current. These decreases or increases in total current in the tubes 14 and 14' are produced, during modulation, by application of modulating voltages to grids 16 and 16' by means of the connections to modulation transformer 27, previously described. The modulation voltages are applied cophasally to grids 16 and 16'; for each direction of variation of current in the discriminators equal and opposite phase shifts are produced in the two phase discriminators, as described above.

As previously described, when modulation voltages are applied to grids 16 and 16', the beam currents in the discriminators 14 and 14' are varied from their quiescent or unmodulated values. These changed beam currents, acting on their corresponding frequency control grids 8 or 8′, cause transient frequency changes and concomitant equal and opposite phase changes of the two magnetron outputs, the phase of one being advanced in proportion to the modulation at the same time that the other is retarded in proportion to the modulation, a like amount. Since these equal and opposite transient phase changes in the two phase discriminators due to modulation are derived from the phase changes in the magnetron outputs, as previously described, it should now be apparent that such phase changes are applied also through diplexer 5 to the common antenna 6. The magnetrons A and B have substantially equal power outputs and operate at the same quiescent or unmodulated frequency. The vector sum of the two magnetron voltages in the antenna 6 has a constant angular velocity.

For the static, quiescent, unmodulated or steady-state condition, the magnetron outputs at diplexer 5 are made to have a relative phase of 90° or a phase difference of 90°. This may be done quite easily by varying the relative lengths of transmission lines 4 and 10 until the desired phase relation is obtained. Phase modulation of the two magnetron voltages is accomplished as previously described, the phases of the two magnetrons being varied in opposite directions at any instant in response to the modulation. By varying the phase of each magnetron voltage at diplexer 5 over a range of 90° (45° on each side of the quiescent phase of such voltage), the power in the antenna 6 (vector sum of the two voltages) may be made to vary between substantially zero and a value equal to twice the power of either magnetron.

Referring again to Fig. 2, if the modulating voltage on grids 16 and 16′ is such as to transiently decrease the current in discriminators 14 and 14′, the decreased current in 14 is applied, by means of frequency control grids 8, to magnetron A in such a way as to momentarily speed it up or increase its frequency, providing a phase change in its output of $+\Delta\phi$ in Fig. 2. This phase change will appear at deflecting plates 13 in such a direction as to return the current in discriminator 14 to its unmodulated value $I_o$. It will be recalled that the current in discriminator 14 depends upon the relative phase of the voltages at 13 and 17, as well as upon the voltage on grid 16. The decreased current in 14′ is applied, by means of grids 8′, to magnetron B in such a way as to momentarily slow it down or decrease its frequency, providing a phase change in its output of $-\Delta\phi$ in Fig. 2. This phase change appears at deflecting plates 13′ in such a direction as to return the current in discriminator 14′ to its unmodulated value $I_o$. The above discussion has proceeded on the assumption that the modulating voltage applied to grids 16 and 16′ rapidly went to a new value and remained there for a finite time. If the modulating voltage continues to changes, the phase relation between the two magnetrons will continue to change.

If the current in discriminators 14 and 14′ increases due to the opposite relative polarity of modulating voltage at 16 and 16′, action in the opposite direction takes place, magnetron A being slowed down to decrease its phase and magnetron B being speeded up to increase its phase.

The action just described may be summarized as follows. The frequency of each magnetron is constant (being determined by crystal oscillator 18 in the manner described previously) at all times except during changes in the modulating voltage. During changes in such modulating voltage, the output frequencies of the two magnetrons are transiently varied in opposite directions to vary their phases oppositely, to the new phase relation called for by the changed value of modulating voltage. When the modulating voltage reaches its new value, the new magnetron phase relation is reached and the original (steady-state) value of current again flows in each discriminator, each magnetron then returning to the stable mean frequency as controlled by crystal oscillator 18.

The above has explained the equal and opposite phase changes of the two magnetrons in response to and in proportion to the modulating voltages applied to 16 and 16′. It will be appreciated that the power outputs of the magnetrons are applied to common antenna 6 through diplexer 5, the two output voltages being vectorially combined in the antenna. Thus, the equal and opposite phase changes caused by the modulating voltages produce amplitude modulation of the resultant antenna power. The more favorable output characteristic for the system is obtained if the two generators A and B are so phased at diplexer 5 as to give increasing antenna power with increasing phase of magnetron A. Therefore, the unmodulated voltage of magnetron A at the diplexer lags by 45° the in-phase or maximum power resultant vector of the two magnetron outputs and the unmodulated voltage of magnetron B at the diplexer leads by 45° this resultant vector.

Referring again to Fig. 2, since the phase shifts in the two phase discriminators due to a change of current therein are equal and opposite just as desired, to compute the power output of the system of Fig. 1 it is necessary to analyze only one of the discriminators. From Fig. 2, it may be seen that $$\tan\theta=\frac{I_o\pm\Delta i}{\pi/2}=-\frac{\Delta i}{\Delta\phi}$$

Therefore, $$\Delta\phi=-\frac{\pi}{2}\Delta i\frac{1}{I_o\pm\Delta i}$$

If we let $$\Delta i=kI_o \qquad (1)$$

then $$\Delta\phi=-\frac{\pi}{2}\frac{k}{1+k}$$

Therefore, $$\phi=\frac{\pi}{2}+\Delta\phi=\frac{\pi}{2}\left[1-\frac{k}{1+k}\right]=\frac{\pi}{2}\left[\frac{1}{1+k}\right] \qquad (2)$$

It is an inherent characteristic of all grid-controlled electron tubes such as 14 and 14′ that the current is proportional to the 3/2 power of the grid voltage, which in the case of Fig. 1 is the modulating voltage. A plot can therefore be made of relative discriminator current as a function of relative modulating voltage. Using such a plot and Equation 1 above, we may compute and plot values for $k$ as a function of the relative modulating voltage.

In the preceding discussion, we have analyzed the discriminator 14, operating at point $a$ of Fig. 2. Continuing with this analysis of only one of the units, $$\text{Relative antenna voltage}=\text{relative generator voltage}\times\sin\left(\phi-\frac{\pi}{4}\right) \qquad (3)$$

since the unmodulated voltage of magnetron A at diplexer 5 lags by 45° the in-phase or maximum power resultant vector of the two magnetron outputs.

We may now compute the antenna voltage as a function of the modulating voltage as follows. Assume a modulating voltage, then from the plot of $k$ as a function of modulating voltage read the corresponding value of $k$. Then, from Equation 2 above, compute the value of $\phi$. Then, from Equation 3 above, the relative antenna voltage may be computed. A series of points may be so obtained and plotted (relative modulator voltage versus relative antenna voltage) to obtain the over-all modulation characteristic.

A typical modulation characteristic for a single one of the units, say discriminator 14 and magnetron A, is shown in Fig. 3. This modulation characteristic is reasonably linear, as may be seen from an inspection of Fig. 3. Since the resultant voltage vector is proportional to the sine of an angle, rather than to the angle itself, since the discriminator beam current is a nonlinear (3/2) function of the grid voltage and since the amount of phase change in Fig. 2 is not the same for the opposite directions of variation of discriminator beam current, compensation would be required to obtain exactly linear modulation.

The system described operates to give increasing power with increasing phase of magnetron A, this increasing phase of magnetron A resulting from a decrease of discriminator current, as shown in Fig. 2. Thus, the discriminator current is decreased (decreased absolute value of potential on grids 16 and 16') for increased antenna power, as may be seen also from Fig. 3. A proper number of stages should be provided in the modulation voltage amplifier, or the secondary 26 should be poled properly, to give the desired direction of variation of antenna power for the appropriate direction of variation of input modulating signal.

What I claim to be my invention is as follows:

1. An amplitude modulation system comprising: a pair of oscillators each provided with an electronic phase controlling means; a source of reference frequency; a pair of beam-type electronic devices each including means for producing an electron beam, two pairs of deflecting electrodes for said beam, a beam intensity control electrode, and an output electrode; means coupling one pair of deflecting electrodes in each device to the output of a corresponding oscillator; means coupling the other pair of deflecting electrodes in each device to the output of said source; means connecting the output electrode of each device to a corresponding one of said oscillators to cause the device beam current to electronically control the phase of its corresponding oscillator; means for applying a modulating signal to the two intensity control electrodes; and means for combining the outputs of said oscillators.

2. An amplitude modulation system, comprising a pair of oscillators operating at a predetermined quiescent phase relation, a source of reference frequency, an electron-beam-type phase discriminator for each oscillator, means for comparing, in one discriminator, the reference frequency with the output frequency of one of said oscillators and for producing a beam current which varies from a predetermined value in response to variations from 90° of the phase angle between the compared frequencies, means for utilizing said current to control the relative phase of said one oscillator, means for comparing, in the other discriminator, the reference frequency with the output frequency of the other oscillator and for producing another beam current which varies from a predetermined value in response to variations from 90° of the phase angle between the last-named compared frequencies, means for utilizing said other current to control the relative phase of said other oscillator, the frequencies of the two oscillators at their respective discriminators having a 180° phase relation to each other, an electron beam intensity control electrode in each discriminator, means for applying to said control electrodes only cophasal modulating signals, to thereby vary the electron beam intensities in said discriminators in the same sense, and means for combining the outputs of said oscillators.

3. An amplitude modulation system comprising: a pair of magnetron oscillators each provided with an electronic frequency controlling means; a source of reference frequency; a pair of beam-type electron discharge devices each including means for producing an electron beam, two pairs of deflecting electrodes for said beam, a beam intensity control electrode, and an output electrode; means coupling one pair of deflecting electrodes in each device to the output of a corresponding oscillator; means coupling the other pair of deflecting electrodes in each device to the output of said source; means connecting the output electrode of each device to a corresponding one of said oscillators to cause the device beam current to electronically control the frequency of its corresponding oscillator; means for applying a modulating signal cophasally to the two intensity control electrodes; and means for combining the outputs of said oscillators in a common load.

References Cited in the file of this patent

UNITED STATES PATENTS

| Number | Name | Date |
|---|---|---|
| 2,113,225 | Wolf | Apr. 5, 1938 |
| 2,369,750 | Nagy et al. | Feb. 20, 1945 |
| 2,411,289 | Mouromtseff et al. | Nov. 19, 1946 |
| 2,432,654 | Buckbee | Dec. 16, 1947 |
| 2,503,394 | Law | Apr. 11, 1950 |
| 2,511,120 | Jueller | June 13, 1950 |
| 2,537,769 | Law | Jan. 9, 1951 |
| 2,620,467 | Donal | Dec. 2, 1952 |